United States Patent [19]

Carse et al.

[11] Patent Number: 4,716,562
[45] Date of Patent: Dec. 29, 1987

[54] TELEPHONE SYSTEM

[75] Inventors: Gregg D. Carse, Mountain View; Bernard N. Daines, Union City, both of Calif.

[73] Assignee: Pacific Bell, San Francisco, Calif.

[21] Appl. No.: 838,571

[22] Filed: Mar. 11, 1986

Related U.S. Application Data

[63] Continuation-in-part of Ser. No. 711,083, Mar. 12, 1985, abandoned.

[51] Int. Cl.[4] .................................................. H04J 3/12
[52] U.S. Cl. ...................................... 370/110.1; 370/93
[58] Field of Search .................... 370/58, 67, 84, 112, 370/110.1; 179/20 P, 18 ES, 18 J; 379/93, 94

[56] References Cited

U.S. PATENT DOCUMENTS

| | | | |
|---|---|---|---|
| 4,302,629 | 11/1981 | Foulkes et al. | 179/2 DP |
| 4,330,687 | 5/1982 | Foulkes et al. | 179/2 DP |
| 4,332,980 | 6/1984 | Reynolds et al. | |
| 4,476,558 | 10/1984 | Arnon . | |
| 4,479,213 | 10/1984 | Galand et al. | 370/110.1 |
| 4,488,294 | 12/1984 | Christensen et al. | 370/110.1 |
| 4,539,676 | 8/1985 | Lucas | 370/60 |

Primary Examiner—Douglas W. Olms
Assistant Examiner—Wellington Chin
Attorney, Agent, or Firm—Fitch, Even, Tabin & Flannery

[57] ABSTRACT

An information transfer system is described for use in a telephone system wherein full duplex digital signal bursts containing a plurality of different types of information are transmitted between a central office and selected locations outside the system which may or may not be subscriber locations. Signal processing circuits receive and disassemble the digital signal bursts into digital information words each comprised of one of the types of information. Gateways are provided for each type of information for converting digital information words into a signal format for transmission to the selected locations. A digital switch couples the signal processing circuits to the gateways for routing the digital information words from the signal processing circuits to the gateways. A control system is coupled to the signal processing circuits, the gateways, and the digital switch for synchronously operating same and for placing each of the digital information words in a preallocated time slot corresponding to the source and destination of the information contained in the digital information word. The recited elements also operate in the reverse direction.

21 Claims, 10 Drawing Figures

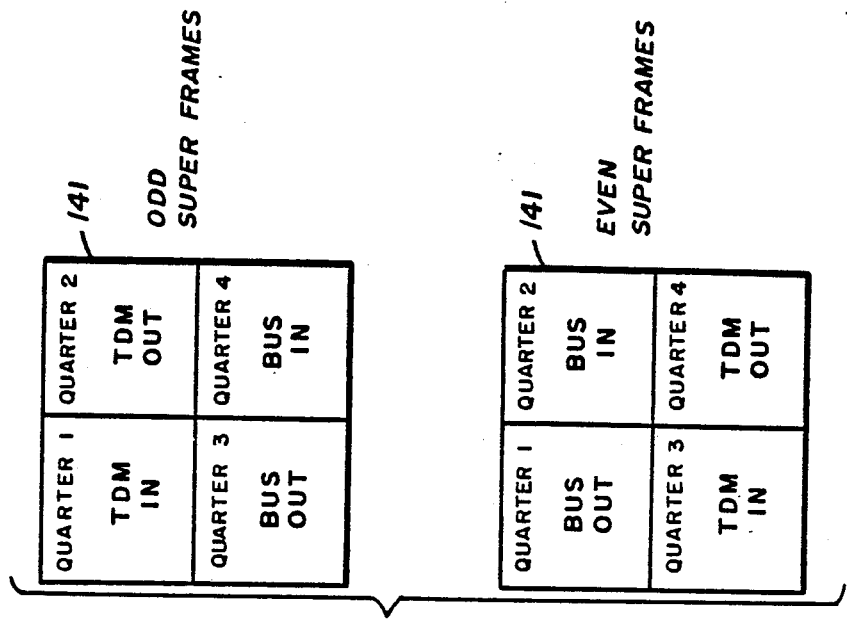
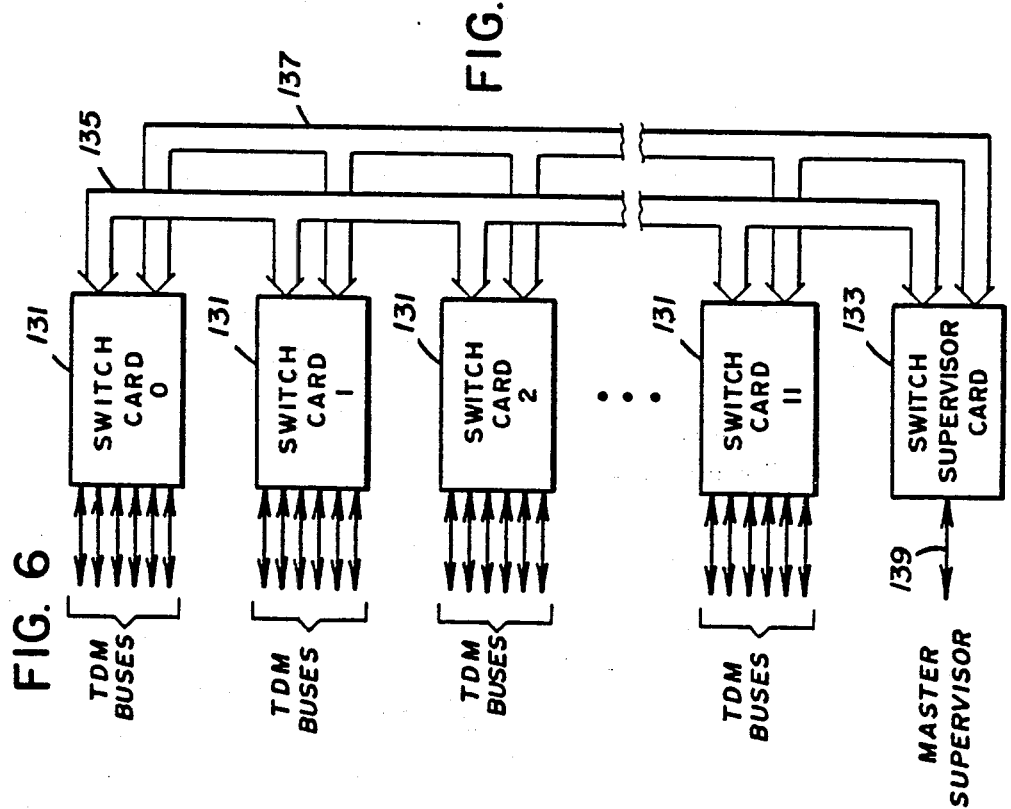
FIG. 8
FIG. 6

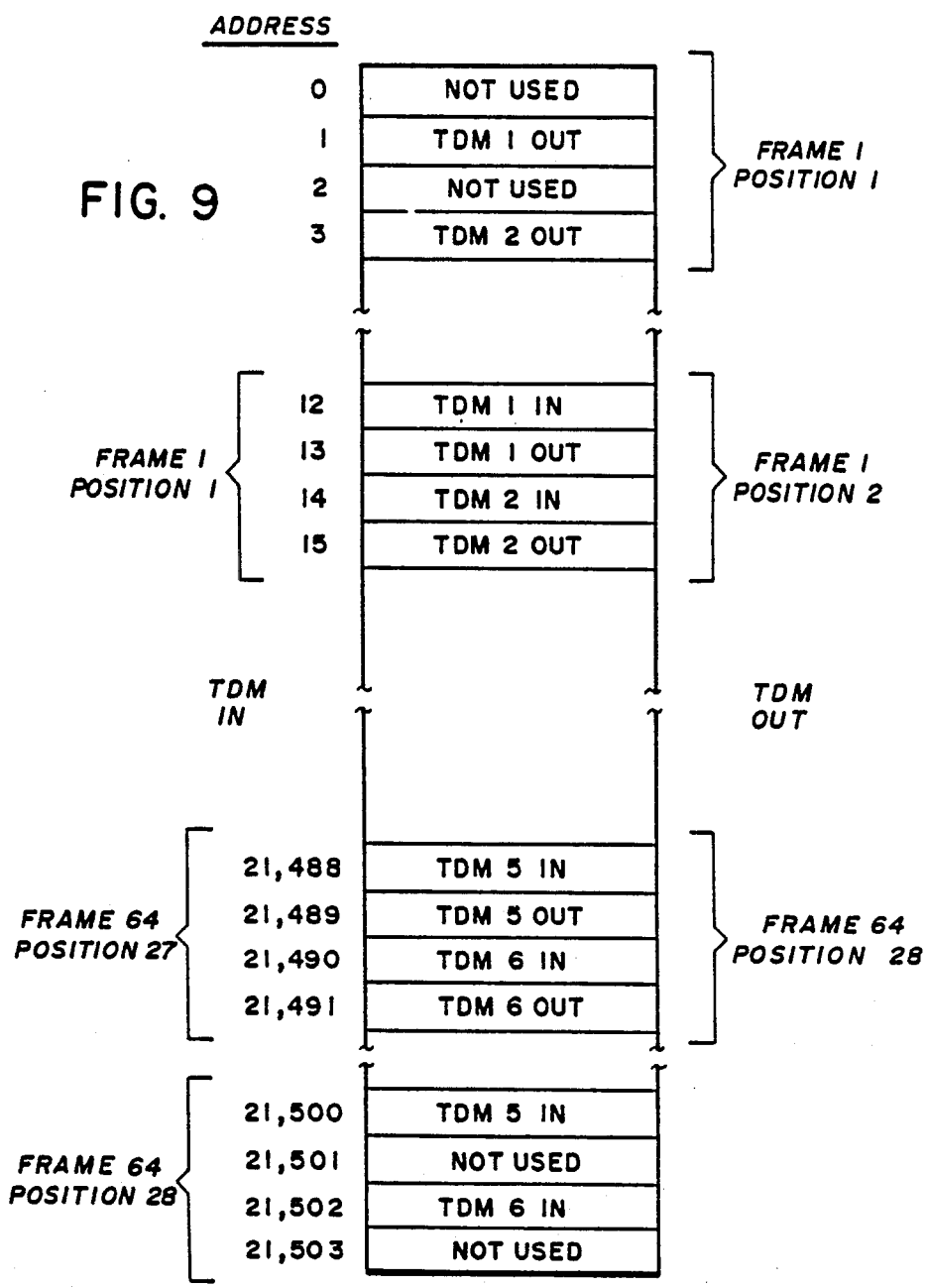

TELEPHONE SYSTEM

This application is a continuation-in-part of application Ser. No. 711,083, filed Mar. 12, 1985, now abandoned.

The present invention relates generally to an information transfer system for use in a telephone system wherein a plurality of subscriber locations are each connected to a central office by a single subscriber loop. More particularly, the invention relates to novel apparatus and techniques for digitizing the existing subscriber loop to provide integrated voice and data services at the subscriber location.

BACKGROUND OF THE INVENTION

Telephone systems in the United States and in many other countries were originally designed solely for the transmission of analog voice signals between subscriber locations and a central office. At the central office, signals from and to the various subscriber locations are typically handled by suitable switching systems. Connection between the central office and each subscriber location is typically by means of a single subscriber loop—usually a twisted pair of insulated copper wires.

With the coming of the "information age," telephone companies have sought ways to increase the level of service to their subscribers. One way of doing this is to increase the capacity of subscriber-to-central office communication by adding subscriber loops. As one might imagine, however, the cost of installing additional subscriber loops for all subscribers in an existing telephone system is prohibitive.

Many telephone companies have, accordingly, explored the use of digital signalling techniques along with multiplexing and time compression in order to cram more information into signals travelling between subscribers and the central office. Since digital transmission techniques via microwave and other long distance signalling systems are already employed, and inasmuch as digital switching is utilized in many modernized central offices, the digitizing of the subscriber loop affords evident advantages. Nevertheless, although the prior art is replete with various approaches to the subscriber loop digitization problem, the difficulties thus far encountered have prevented practical commercial fulfillment of this objective.

By way of example, a bidirectional subscriber loop transmission system is described by Soejima, et al., "Experimental Bidirectional Subscriber Loop Transmission System," IEEE Transactions on Communications, Vol. Com-30, No. 9, September 1982. This system is based on a time compression burst mode transmission scheme (ping-pong), and provides two information channels and a signalling channel. In this, and other similar systems, however, serious problems are encountered in achieving sufficient transmission quality over the distances usually encountered in connection with subscriber service. Such problems include cross talk, echoing as a result of discontinuities and taps in the line, and the natural attenuation of high frequency signals with transmission distance.

Other difficulties arise in connection with the combining of voice information with data. The data may take the form of relatively high speed data such as that utilized by a computer terminal, or relatively low speed data such as alarms or medical or police alert functions. By way of example, U.S. Pat. No. 4,476,558, to Arnon describes a digital transmission signal system employing time compression multiplexing in which burst mode or ping-pong transmission is utilized. However, only voice information is transmitted and there is no successful combination of voice and data in this system. In another example, U.S. Pat. No. 4,332,980, transmission of both voice and data is described. However, in this system, a "voice over data" technique is utilized wherein the voice information remains in analog form and wherein the data transmission is transmitted at a different and supposedly noninterfering frequency.

Nowhere in the prior art is there a teaching of a transmission method and system capable of handling both voice and data in digitized format which can be successfully applied to typical existing telephone subscriber systems. Either the capacity for handling the voice and data information is inadequate, or the transmission quality and distance is insufficient for commercial application, or both. The problems created by typical irregularities in subscriber loops resulting from discontinuities, taps, oxidation, etc. create unacceptable echo signals. Cross talk between the various data channels is in many cases unacceptable. Transmission distance to adequately serve typical subscriber locations is frequently not achieved. Quality of voice information is often unacceptable.

An additional problem encountered in converting a conventional telephone system from analog to digital operation is that, if conventional central office equipment must be replaced, there is a massive expense and reconstruction effort required. Moreover, the transition of subscribers to the additional services which digitized telephone systems make available most probably will be gradual. Thus, there is a need for an approach to digitizing a telephone system which will permit gradual changeover from conventional analog to digital operation without causing major disruptions or requiring major conversions of existing telephone equipment and service.

SUMMARY OF THE INVENTION

Accordingly, it is an object of the present invention to provide an improved telephone system of the type wherein a plurality of subscriber locations are each connected to a central office by a single subscriber loop.

Another object of the invention is to provide a means for efficiently adapting an existing conventional analog telephone system to digital operation.

A further object of the invention is to provide an improved telephone system of the type described wherein different types of information received in multiplexed signals on subscriber loops are efficiently and accurately transferred to their appropriate destinations.

Another object of the invention is to provide an improved telephone system of the type described wherein signals containing various types of information are efficiently and accurately transferred from their respective sources to selected subscriber locations.

Still another object of the invention is to provide an improved telephone system of the type described wherein a large degree to flexibility is available in the transfer of information between subscriber locations and various remote locations.

Other objects, advantages and features of the present invention will become apparent to those skilled in the art from the following description, taken in connection with the accompanying drawings and appended claims.

Very generally, the information transfer system of the invention is employed in connection with a telephone system having a plurality of subscribers premises connected to a central office by a corresponding plurality of subscriber loops. The invention provides full duplex voice and data service to the subscriber's premises on an as requested basis. Remote multiplexers are located proximate each subscriber's premises requesting the service.

Full duplex digital signal bursts containing a plurality of types of information are transmitted between the central office and the remote multiplexers. Signals of the respective types of information are transmitted between the central office and corresponding remote locations which may or may not be subscriber locations. In the information transfer system of the invention, a transceiver or transceivers receive and transmit the digital signal bursts from and to the subscriber locations. The received bursts are disassembled into digital information words of equal bit length, each digital information word being comprised of only one of the types of information in the received digital signal bursts. In addition, digital signal bursts are assembled from digital information words of different types of information for transmission to the subscriber locations. Gateways are provided for each type of information for converting the digital information words of one type of information into a predetermined signal format for transmission to a remote location and for receiving signals in a predetermined format for converting same into equal length digital information words of one type of information. A switch system couples the signal processors to the gateways for routing the digital information words from the signal processors to one of the gateways corresponding to the type of information in each digital word. Also, the switch system routes the digital information words from each of the gateways to the signal processors for assembly into digital signal bursts. A control system coupled to the signal processors, the gateways, and the switch system, synchronously operates same and causes same to place each of the digital information words in a preallocated time slot, whereby each digital information word in identifiable by its time slot.

BRIEF DESCRIPTION OF THE DRAWINGS

FIG. 6 is a schematic block diagram of the system switch illustrated in FIG. 1;

FIG. 8 is a memory map of the TDM memory of FIG. 7;

FIG. 9 is a memory map of the configuration memory of FIG. 7; and

DESCRIPTION OF THE PREFERRED EMBODIMENT

The System

Figure 1:
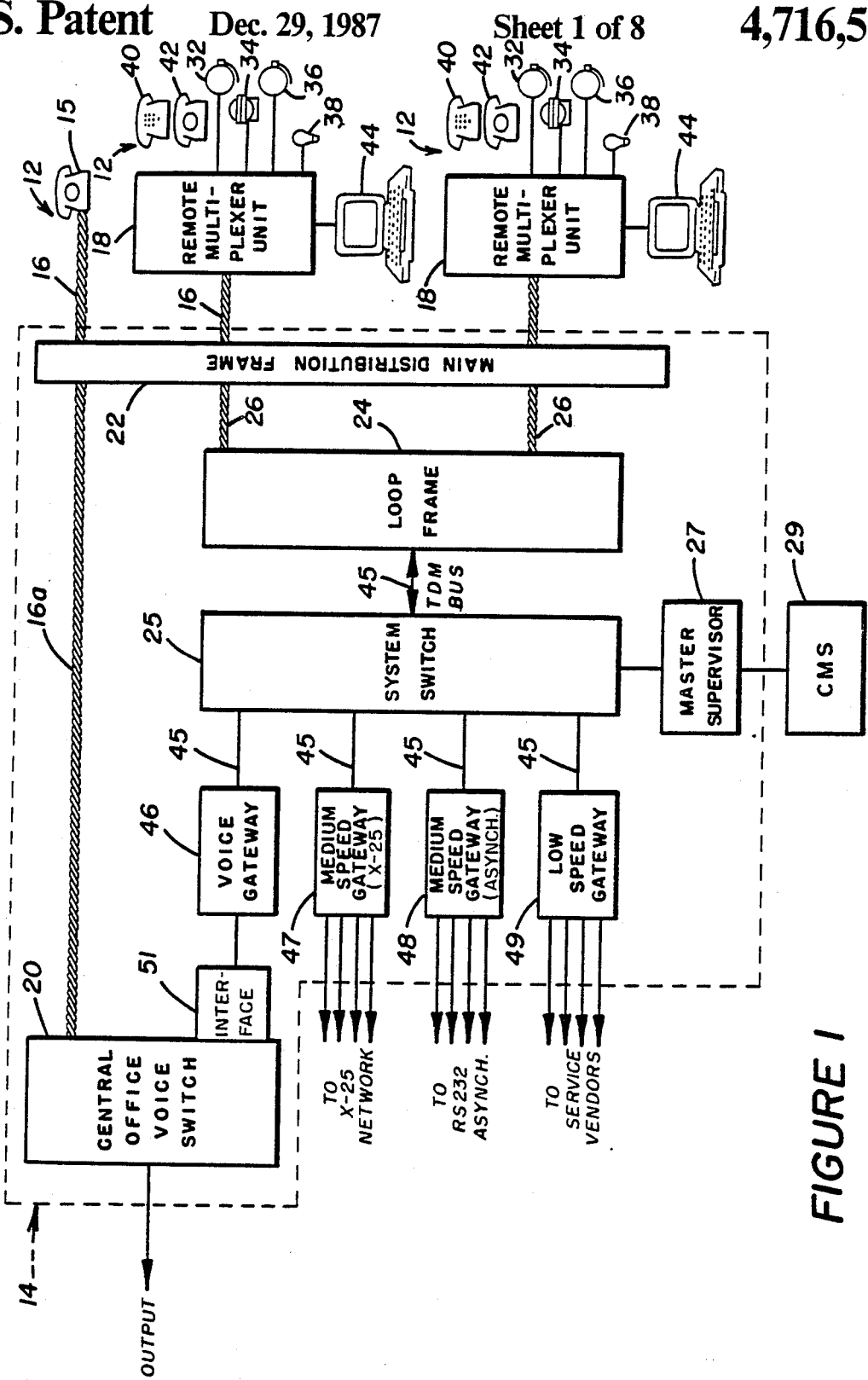
FIG. 1 is a schematic block diagram of a telephone system in which a digitizing system constructed according to the principles of the present invention is incorporated.

Referring now to FIG. 1, there is shown a telephone system in which a digitizing system constructed in accordance with the principles of the present invention is employed. The telephone system connects a plurality of subscriber locations 12 to a central office 14. A single subscriber loop 16, also known as a twisted pair, electrically connects each subscriber location 12 to the central office 14. Suitable protection blocks, not shown, may be distributed along each subscriber loop 16, as is known in the art. The protection blocks electrically protect the central office circuitry and subscriber equipment from voltage spikes and surges occurring along the subscriber loop 16. Such voltage spikes and surges are typically caused by lighting and other electrical interferences.

The uppermost subscriber location 12 in FIG. 1 is illustrated as a conventional analog connection. In this case, the subscriber loop 16 connects a standard telephone set 15 to the central office main distribution frame 22. From the main distribution frame, a two wire connection 16a continues the subscriber loop to a central office voice switch 20, which may be either an analog or digital switch of conventional design. The present invention enables the just-described type of analog service to be upgraded to multi-channel service, for example, two voice channels, a medium speed data channel, and four low speed data channels. Moreover, such upgrades can be provided with minimum perturbation of existing analog service and equipment.

Located at or near each subscriber location 12 wherein services contemplated by the present invention are desired, is a remote multiplexer unit 18 which provides the interface for connection of subscriber equipment to the central office 14. In a preferred embodiment of the present invention, the unit 18 (described more fully below) supports the following input-output (I/O) connections for subscriber equipment:

(1) two phone connections or voiceband data modem connections;

(2) one medium speed asynchronous modemless data connection; and (3) four low speed asynchronous data connections for telemetry applications.

Since the preferred embodiment of the present invention is intended to utilize as much pre-existing telephone equipment as possible, the remote multiplexer unit 18 preferably uses standard cable and connectors for subscriber owned equipment. Thus, in the preferred form for the Northern California service area, the phone connections are standard RJ-11 connectors, and the high speed asynchronous modemless data connection and the four low speed asynchronous modemless data connections are through an eight pin RJ-41 connector. Of course, it would be within the level of ordinary skill to provide a subscriber unit which would support other combinations of subscriber owned equipment and connectors.

Generally, the remote multiplexer unit 18 digitally encodes, multiplexes and transmits the voice signals and data signals applied to the above described connections to the central office 14 over the subscriber loop 16. Conversely, the unit 18 demultiplexes and decodes the digital information received from the central office 14 over the subscriber loop 16 and delivers the decoded voice signals and decoded data signals to the appropriate subscriber equipment.

The central office 14 includes the telephone company switching system 20, which may be either an analog or digital switching system, and a conventional main distribution frame 22. Each subscriber loop 16 is terminated at the central office 14 at the main distribution frame 22. For those subscriber locations having ordinary telephone service, i.e. which do not have a unit 18, the main distribution frame 22 connects the subscriber loop for ordinary telephone service directly to the telephone company switching system 20 through a twisted pair 16a. However, those subscriber locations, such as the subscriber location 12, which have a remote multiplexer unit 18, the main distribution frame 22 connects the subscriber loop 16 to a loop frame 24 by a twisted pair 26 associated with each subscriber loop 16. Thus, for each subscriber loop 16, there is one twisted pair 26 connecting such subscriber loop 16 to the loop frame 24.

Generally, the loop frame 24 multiplexes and demultiplexes the digital information passing between the central office 14 and each remote multiplexer unit 18 along its associated subscriber loop 16. As explained in greater detail below, data arriving at the loop frame from the remote multiplexer units is accumulated and sorted as necessary to form data words, preferably nine bit bytes (nytes), of the respective kinds of information (e.g. voice, low speed data, medium speed data). These are encoded as to origin by assigning them to a specific time slot as they pass through the system. The added bit designates whether that nyte is data or control. The loop frame also functions conversely in the reverse direction to sort and assemble data received from the system switch 25 for transmission to the various remote multiplexer units. In some cases, it may be preferred to switch the voice information in a conventional manner. In such a case, the loop frame can convert the received digitally encoded voice information back to analog and send it to the central office voice switch 20, either directly or via the main distribution frame. The telephone company switching system 20 may then switch the voice channel or channels to the respective intended recipient.

The remote multiplexer unit 18 includes means for encoding low speed data signals from sources of low speed data signals such as low speed services 32, 34, 36 and 38. The subscriber unit 18 also includes means for encoding the voice signals from a source of voice signals such as indicated by telephones 40 and 42, and means for encoding medium speed data signals from a source of medium speed data signals such as a computer 44.

According to the present invention, no assumptions are made by the system about the format of the encoding of the data applied to the medium or low speed data channels. A preferrable interface for use in the medium speed and low speed gateways is EIA RS-232-C specification. Such specification prescribes the electrical interface and bit format for exchange of information across the interface. Inputs to these channels may be wired as dedicated paths to various services such as Telenet (a trademark), intruder detection and control, as indicated by the alarm 32; power monitoring, as indicated by electric meter 34; automatic notification of emergency services, as indicated by fire alarm 36; and an energy management system as indicated by the light bulb 38. Thus, any type of device can be connected to these medium and low speed inputs up to the maximum baud rate for which the channel is adapted. Preferably, each low speed input is capable of handling data at rates up to the order of 1200 baud, and the medium speed input is capable of 9600 baud.

The encoding performed by the remote multiplexer unit 18 develops a plurality of successive frames. In a preferred form, each of the frames has first voice bits encoding voice signals from the telephone 40 and second voice bits encoding voice signals from the telephone 42. Preferably, each frame also includes at least one data bit encoding the data signal for each of the associated one of low speed services 32-38 and a plurality of medium speed data bits encoding the data signals from the computer 44. Conversely, the unit 18 decodes such frames as received from the central office 14 into the appropriate signals for application to the subscribers devices.

The unit 18 further includes a suitable transceiver for transmitting the successive frames from each subscriber unit 18 on the subscriber loop 16 associated therewith and for receiving such frames from the central office. A suitable transceiver for use in the unit 18 is a Motorola DLT.

Each subscriber loop 16, as previously mentioned, is terminated by the main distribution frame 22 which routes the digital signals on each subscriber loop 16 to the loop frame 24. The loop frame 24 is responsive to receipt of the successive frames from each subscriber loop 16 for reconfiguring the successive frames on each subscriber loop 16 into data words containing voice or digital data, respectively. In the preferred embodiment, the data words comprise nine bit bytes (nytes). In the preferred form of signal, such information includes first voice information signals from the first voice bits and second voice information signals from the second voice bits. Such information also includes medium and low speed data bits. The loop frame 24 multiplexes the voice nytes, the medium speed data nytes, and the low speed data nytes in all frames from all subscribers into TDM data streams in which each nyte or data word occupies a bus and a time slot by which it is identified. One bit on each nyte is used to indicate whether that word contains information bits or control bits, as explained below.

In a preferred embodiment of the present invention, the loop frame 24 is comprised of a plurality of loop cards, described below, each of which is connected to a respective subscriber loop on the one hand and, via a supervisor card described below, to a common TDM bus 45 on the other hand. The bus 45 connects to the system switch 25. The central office 14 may include any number of loop frames 24, which number depends upon the number of loop cards supported by each loop frame. For example, a typical central office may include twelve loop frames, wherein each loop frame supports four hundred eighty subscriber loops.

According to the present invention, the system switch 25 receives a plurality of TDM data streams from the loop frames 24. The system switch 25 is a high speed switch which sorts the data words in the TDM data stream on the bus 45. The system switch is controlled by a suitable master supervisor 27 and also communicates with a suitable control and management system (CMS) 29. Each of the TDM data words developed by the loop frame 24 is applied by the system switch 25 to an associated one of a plurality of gateways: a voice gateway 46, an X-25 format medium speed gateway 47, an asynchronous medium speed gateway 48, and a low speed gateway 49. The gateways serve to demultiplex the TDM voice and data signals applied thereto and route such signals to an intended destination. For example, voice data words are routed to a voice interface 51 and then, formatted properly, the voice information is switched appropriately by the central office voice switch 20. Similarly, medium speed data is formatted to X-25 or is sent out asynchronously as RS232. The low speed data may be demultiplexed as the low speed data signals originally applied to one of the ports on one of the units 18 and routed to an intended data services vendor.

The Remote Multiplexer

Figure 2:
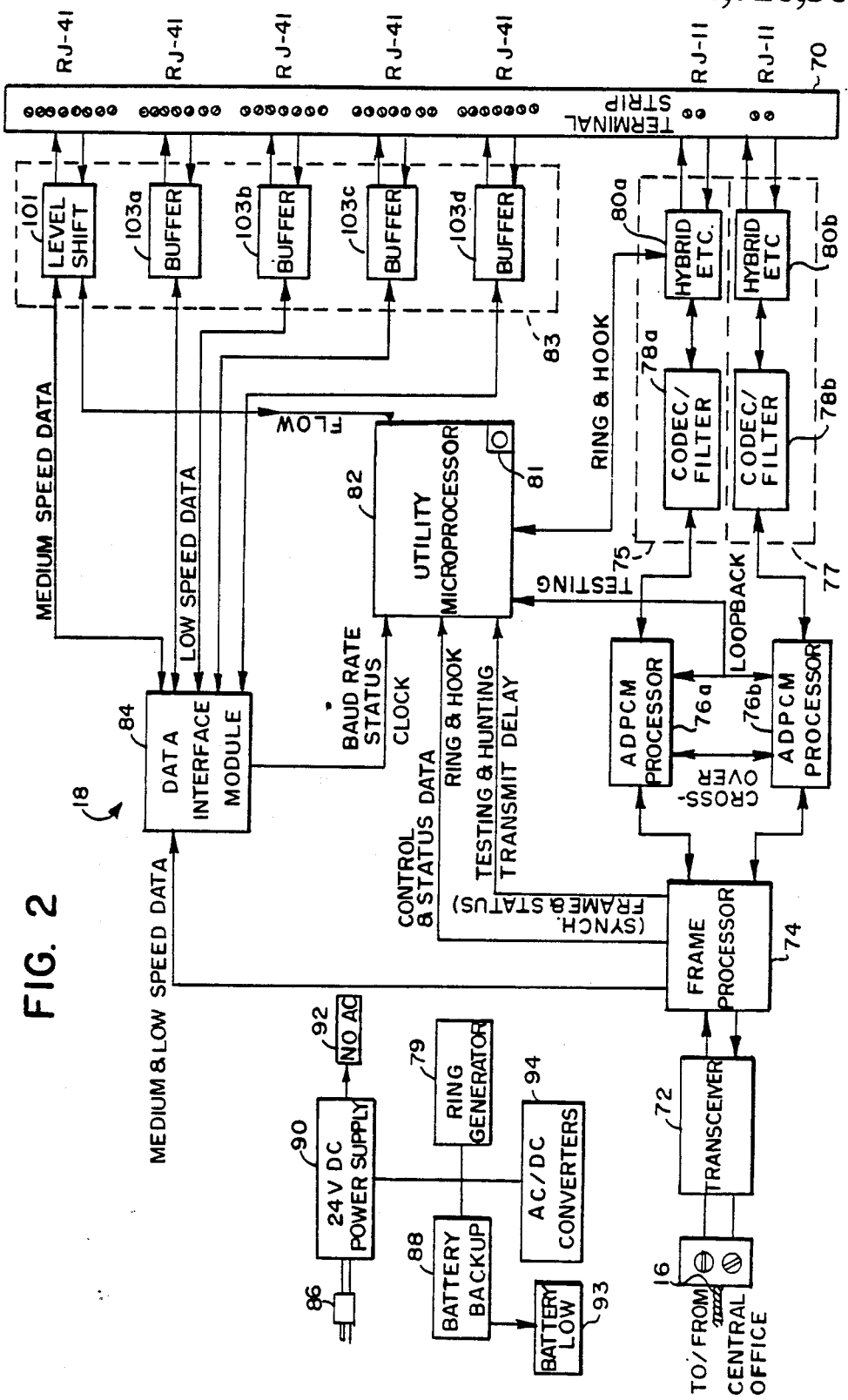
FIG. 2 is a schematic block diagram of a remote multiplexer unit illustrated in FIG. 1.

Referring now to FIG. 2, there is shown a schematic block diagram of the remote multiplexer unit 18. A terminal strip 70 hard wires the external modular connectors described above to the internal circuitry of the remote multiplexer unit 18. The remote multiplexer unit 18 includes a transceiver 72 which transmits and receives the digital information over the subscriber loop 16, a ping-pong unit 74 which multiplexes the various voice and data channels to form the frames transmitted over subscriber loop 16, an adaptive differential pulse code modulation (ADPCM) processor 76 in each voice channel, each of which converts between PCM coded voice information and ADPCM coded voice information, a codec/filter 78 and a hybrid circuit 80 associated with each voice channel for encoding the voice signals from each source of voice signals 40 and 42 to standard PCM format providing the voice interface and, a utility microprocessor 82 which implements the signal and control status channel protocol and multiplexes the low speed data channels from the sources 32, 34, 36 and 38, and a data set interface (DSI) circuit 84 which encodes the asynchronous medium speed data signals from the source 44 to synchronous format.

The flow of data through the remote multiplexer is bidirectional. To simplify the description only one direction will be explained—from the central office to subscriber premise equipment. Unless otherwise stated, voice, data, and signal flow from subscriber premise equipment to the central office is simply the reverse of that explained.

The transceiver 72 is the interface to the subscriber loop, and is responsible for transmitting data to and receiving data from the central office. Multiplexed voice, data, control, and signaling information from the central office is transmitted over the subscriber loop and received by the transceiver. In the opposite direction, a multiplexed stream of voice, data, control and signaling information is passed from the remote multiplexer unit by the transceiver to the central office over the subscriber loop. Preferably, the effective bandwidth of the transmission is 80 kilobits per second. The channel is divided into two 32 kilobit per second digital voice channels, one 8 kilobit per second medium speed data channel, four 1 kilobit per second low speed data channels, one 2 kilobit per second control channel, and one 2 kilobit per second signaling channel. Each of the voice and data channels is independent, and all may be used simultaneously. From the perspective of the subscriber, it is as if the premises are wired with seven distinct telephone lines. The control and signaling channels carry system control and voice signaling, and data signaling information (respectively) between the remote multiplexer and the central office. A suitable transceiver for use in this application is a Motorola DLT.

The frame processor or ping-pong unit 74 interfaces the transceiver to the two voice modules, the data interface module, and the utility processor. It demultiplexes the signals received from the transceiver and routes them to the appropriate remote multiplexer component (e.g., digital voice to the voice modules 75 and 77; data to the data interface module 84). In the preferred embodiment, the frame processor assembles voice data, low speed data, and medium speed data into bit frames which are 80 bits long. Similarly, the frame processor disassembles such frames as they are received by the transceiver, routing them along the medium speed, low speed, and voice data paths. The 80 bit frames are transmitted in alternating directions as in the ping-pong transmission mode known in the art. The timing of the signal leaving transceiver 72 is adjusted by a suitable clock 81 in the utility processor 82 so that each frame or burst of data leaving the transceiver is received at the central office substantially simultaneously with the frames arriving from other remote multiplexer units in the telephone system. This substantially reduces so-called near end crosstalk.

The data interface module 84 interfaces with the frame processor 74, the utility processor 82 and the medium and low-speed data interface ports indicated generally at 83. It receives data channel information (medium and low-speed data, data channel signaling information) from the frame processor 74 and routes the data and signaling information to the appropriate data interface ports. It also reads data and status information from the ports, and at the proper time, delivers this information to the frame processor.

The utility processor 82 manages voice signals, configures and controls the remote multiplexer components, and communicates with the central office through the control channel (multiplexed on the subscriber loop). The microprocessor may be of any type suited to run software appropriate to the control and supervisory functions described. A suitable microprocessor for use in this application is a Zilog Z80.

There are two voice modules 75 and 77 per remote multiplexer; each supports one 500-series (or compatible) telephone circuit. The voice modules convert digitally encoded voice signals from the central office to voice-frequency (analog) signals. The voice module then routes the voice-frequency signals to the appropriate voice interface port as described more fully below.

The ring generator 79 is controlled by the utility processor, and supplies the 90 V rms (with a −24 V offset), as known in the art, required to ring a subscriber's telephone. Unless the remote multiplexer is on battery power as described below, ringing will match the cadence supplied by the central office voice switch.

In a preferred embodiment of the present invention, the central office 14 does not supply electrical power to the remote multiplexer unit 18 over the subscriber loop 16. Instead, power is supplied to the remote multiplexer unit 18 from a source of local AC power 86 located at the subscriber location 12. In case of power failure, a battery backup 88 provides DC power to the remote multiplexer 18. In the event of failure of local AC power, an AC power failure alarm 92 switches the power supply 90 to the battery backup 88. When power is being supplied by battery backup 88, there is no noticeable change in the performance of the remote multiplexer unit 18 except that the ringing sequence developed by the ring generator 79 is changed to conserve power from the battery backup 88. When local AC power fails, the remote multiplexer unit 18 alerts the central office 14 by an alarm signal developed by the alarm 92. The microprocessor 82 multiplexes this alarm signal in the transmission. When the battery backup 88 loses its charge, noted by an indicator 93 the remote multiplexer 18 discontinues transmission and service is lost until power is returned. Also coupled to the power supply 90 is a plurality of suitable DC-DC converters 94 to provide the various DC voltage levels for the circuitry of the remote multiplexer unit 18.

The utility microprocessor 82 in addition to the functions described above, further communicates with the central office 14 over the signal and control/status channels. The supervisory signals associated with the voice and data channels are passed to and from central the office 14 on the signal channel. The microprocessor 82 interprets the encoded signals and delivers them to the correct microprocessor component. By design, the digitally encoded supervisory signals introduce no significant difference in timing or delays from the analog signaling they replace.

Figure 4:
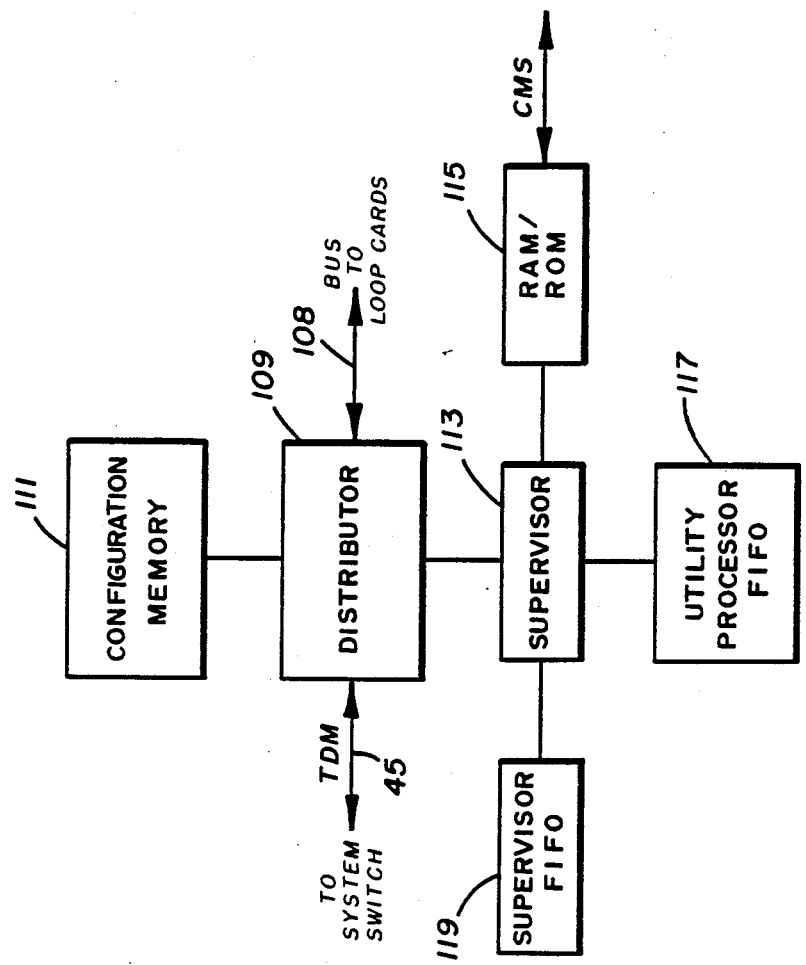
FIG. 4 is a schematic block diagram of a supervisor card used in the loop frame illustrated in FIG. 1 and which also illustrates the configurations of a supervisor card used in the gateways illustrated in FIG. 1.

The remote multiplexer unit 18 is controlled from the central office 14 by the loop frame 24 and more particularly by the loop cage supervisor (FIG. 4). The loop cage supervisor sends commands to the utility microprocessor 82 on the control/status channel. These commands are interpreted by the microprocessor 82. In the other direction, the microprocessor 82 sends status information to the loop cage supervisor.

The cable from each RJ-11 connector, connected to one of the phone sets 19 or 21 or to a modem (not shown) is attached to the remote multiplexer unit 18 by two screw down connectors illustrated in the terminal strip 70. The analog voice signals are applied to the voice modules 75 and 77. Each module contains a hybrid circuit 80a and 80b, respectively, where the subscriber transmitted and received signals are separated for processing. The analog voice signals are applied to an active filter within a codec/filter 78a and 78b, respectively, to restrict the effective output to the voice frequency range. The filtered analog voice signals are then converted to standard pulse code modulated (PCM) by the codec portion of the codec/filters 78. The PCM encoded voice channels are then converted to 32 kilobits per second CCITT ADPCM-DLQ by digital signal processors (DSP) 76a and 76b programmed to implement the conversion algorithm. The voice channels are then passed to the frame processor unit 74 where they are multiplexed with other channels supported by the remote multiplexer unit 18. The multiplexed information is transmitted to the central office 14 by the transceiver 72 along the subscriber loop 16. Preferably, 8 four bit voice samples are buffered by the frame processor 74 before being transmitted each millisecond during a "pong" burst.

Supervisory signals from the phone connection (off-hook, dial pulse) are picked up at the hybrid circuits 80a and 80b and passed to the microprocessor 82. The microprocessor 82 encodes the voice supervisory signals and multiplexes them with signaling for other channels, and passes the information to the frame processor 74 to be multiplexed with other information on the signal channel. Ring indication is passed in the opposite direction from the central office 14 to the subscriber equipment connected to the remote multiplexer unit 18 in the same manner.

Medium speed data is transported within the telephone system over full duplex, 8 kb/s synchronous channels. These channels can support 9600 baud asynchronous data rates because the framing bits (start and stop bits) that accompany each byte of asynchronous data are not transported through the channel. Medium speed data is restored to its original format before it is transmitted to the destination equipment.

When a customer requests a medium speed vendor services, the medium speed data path must be established between the remote multiplexer 18 and a medium speed vendor interface line. The medium speed data channel is established by the control and management system 29 (FIG. 1) of the telephone system. Data from the remote multiplexer unit 18 is transported to the loop frame 24 over the subscriber loop 16. The same physical path is used to transport data from the vendor via the central office 14 to the remote multiplexer unit 18.

Although modems are not necessary for medium speed data paths, modem signaling is used at each end of a medium speed data channel to allow an easy connection of existing vendor terminal and subscriber equipment. For example, the telephone system provides an RS-232-C data circuit terminating equipment (DCE) interface to both subscriber and vendor interface equipment. The RS-232-C signal interface uses a data set ready (DSR) and clear to send (CTS) signal at the subscriber interface and the vendor interface. The DSR and CTS signals are always asserted as long as there is power and the data path through the telephone system is functional. The data terminal ready (DTR) signal from the subscriber equipment is presented as a data carrier detect (DCD) signal to the vendor interface equipment. Similarly, the DTR signal from the vendor interface equipment is presented to the subscriber interface as a DCD signal. This allows the subscriber and vendor interface equipment to interact using conventional modem style signaling as if they were connected through a switched circuit. When the subscriber's terminal asserts DTR, the DCD signal at the vendor interface appears to the vendor as though a switch modem has just accepted a dialed connection. The RTS signal is not required by the telephone system and is hence ignored.

The data interface module 84 handles all data input/output in the remote multiplexer unit 18. The module 84 performs the additional function of encoding the asynchronous data into a bit stuffed synchronous format suitable for transmitting over the medium speed data channel of the telephone system. When synchronous medium speed data is received by the remote multiplexer unit 18, the module 84 restores the data to its asynchronous format. In the medium speed synchronous protocol, the number of bits that must be transmitted is reduced. Preferably a fixed 8 kilobit channel is used to transmit and receive medium speed data at any data rate. When there is no medium speed data to transmit over the medium speed channel, a fixed stream of synchronization bits is transmitted.

The remote multiplexer unit 18 provides the physical access point via a shift level 101 to one of the RJ-41 connectors at the terminal strip 70 for customer equipment connected to the medium speed data channel. The remote multiplexer unit 18 transmits all medium speed data from the subscriber premise equipment to the loop frame 24 over the subscriber loop 16 and outputs all medium speed data from the loop frame 24 to the remote multiplexer unit 18. The remote multiplexer unit 18 is able to set asynchronous input/output characteristics such as baud rate. The input/output characteristics are set by a suitable control and management system (CMS) (not shown) located at the central office 14 when a medium speed channel is initially activated and when a customer requests that existing service be changed. The utility microprocessor 82 continually monitors the medium speed channel interface hardware for potential problems. Hardware errors cause an alarm message to be transmitted to the loop frame 24. If a problem is detected, the remote utility processor 82 may be configured to run diagnostic programs to define the nature and extent of the hardware problem. The remote multiplexer unit 18 may also be configured to loop back medium speed data from central office loop cards. Loop back testing is used throughout a telephone system to insure that data is being transmitted and received correctly.

The medium speed channel supports data rates of 300, 1200, 2400, 4800 or 9600 baud via the level shift 101. The asynchronous connections on both sides of a medium speed channel are configured with the same baud rate. The data rate for the subscribers data channel is set at subscription time. The transmission characteristics of the shift level 101 are configured when the medium speed channel is first established. Customers are able to change their medium speed channel input/output settings by means of the CMS via the utility processor 82.

A subscriber accesses medium-speed data services by connecting data termination equipment (DTE), such as a personal computer or asynchronous display terminal, to the remote multiplexer medium-speed data port. This port is preferably a standard 8-pin, non-keyed modular jack and conforms to the specifications described in the publication, *Bell System Technical Reference: Miniature Plugs and Jacks*, December, 1982, PUB 47102. The medium-speed data port provides an asynchronous, full-duplex, RS-232-C (Type D) compatible, DCE (data communications equipment) interface that supports data rates up to 9600 baud. Table 3 lists this port's wire assignments; Table 4 describes port configuration.

TABLE 3

Medium-Speed Port Pin Assignments

| Pin | Signal | Description |
| --- | --- | --- |
| 1 | RX | Receive Data |
| 2 | CTS | Clear to Send |
| 3 | DCD | Data Carrier Detect |
| 4 | SG | Signal Ground |
| 5 | DSR | Data Set Ready |
| 6 | DTR | Data Terminal Ready |
| 7 | RTS | Request to Send |
| 8 | TX | Transmit Data |

TABLE 4

Medium-Speed Port - Standard Configuration

| | |
| --- | --- |
| Port Type | DCE |
| RTS/CTS Strapping | Off |
| Baud Rate | Autobaud[2] |
| Stop Bits | 1 |
| Character Length | 8 bits |
| Parity | None |

Alternate port configurations are possible, and increase the variety of subscriber-premises equipment that can be connected. Options may include configuration as DTE, type of service (dedicated, contention-based), flow control signaling, and character-format options (parity, number of stop bits, character length, baud rate/autobaud).

The remote multiplexer unit 18 further supports four bidirectional constant transmission asynchronous one kilobit per second data channels. These low speed data channels deliver services from the low speed data service vendors to the remote multiplexer 18 through the RJ-41 modular connectors connected to terminal strip 70 and the buffers 103a–103d. Examples of such low speed data services include utility meter reading, alarm and security service, energy management, credit card verification, point of sale terminals and videotex. Subscriber premise equipment delivers the low speed data to the RJ-41 interfaced at the terminal strip 70. The vendor premise equipment actually provides the service. The low speed data channels of the telephone system allow the subscriber premise equipment and the vendor premise equipment to communicate with each other.

The remote multiplexer unit 18 accepts the low speed data signals from the subscriber premise equipment and multiplexes it with the voice and high speed data and transmits the multiplex stream to the central office 14. The low speed data is suitably sorted when it arrives at the central office and is delivered to the appropriate low speed data services vendor. An advantage of the low speed data channel is that such low speed data services are multiplexed with other services, voice and medium speed data, on the existing single subscriber loop 16. Hence, the cost to deliver such low speed services is greatly reduced. Secondly, the low speed data from a plurality of remote multiplexer unit 18 can be concentrated onto a single communications line to the low speed data services vendor, further reducing the cost of the service to the vendor.

In a preferred embodiment of the present invention, the remote multiplexer unit 18 provides an interface for four 1–2 kilobit per second asynchronous data channels for the bidirectional transfer of data between the remote multiplexer unit 18 and the vendor premise equipment (not shown) connected to the central office 14. In the remote multiplexer unit 18, the microprocessor 82 manages the low speed data communications, configures the low speed ports, institutes diagnostics, and detects and reports alarm conditions. The four low speed data channels provided by the remote multiplexer unit 18 are full duplex asynchronous data communication channels preferrably operating at speeds up to 1,200 bits per second. Each of the channels is fully independent of the other channels. A clock signal appropriate to such transfer rate is presented from the utility microprocessor 82 to the subscriber premise equipment. Each channel can be independently activated or configured for speed.

Configuration of the low speed data ports is carried out by the microprocessor 82 in the remote multiplexer unit 18 under control of a corresponding loop cage supervisor (FIG. 4) in the central office 14. The loop cage supervisor may be designed to issue low speed data channel configuration commands over the control and status channel provided in the telephone system.

The microprocessor 82 in the remote multiplexer unit 18 executes low speed data channel diagnostics under the request of the supervisor in the loop frame 24. Diagnostic request and responses are delivered over the control status channel. The supervisor in the loop frame 24 can request loop back diagnostics of the remote multiplexer unit 18 low speed data channels. Such diagnostics indicate error conditions in the channel path. Each low speed data channel has one loop back point in the remote multiplexer unit 18 located at the microprocessor 82. Data from subscriber premise equipment can be looped back at the remote multiplexer unit 18. Data from the central office 14 can also be looped back to the central office 14. Test data can be injected or tested at the loop back point, permitting bit error rate statistics to be generated.

The buffers 103a–103d are coupled in each low speed data channel between the microprocessor 82 and the terminal strips 70 at each RJ-41 interface. Since each low-speed data port can support a single channel, the subscriber may use up to four low-speed services simultaneously; for example, burglar detection, meter-reading, fire detection, and medical-alert services.

The low-speed data ports are standard 8-pin, non-keyed modular jacks (see FIG. 3 in the "Medium-Speed Data Interface" section) and conform to the specifications described in the publication, *Bell System Technical Reference: Miniature Plugs and Jacks*, December, 1982, PUB 47102. Each low-speed data port provides an asynchronous, full-duplex, RS-232-C (Type D) compatible, DCE (data communications equipment) interface that supports data rates up to 1200 baud. Table 5 lists this port's wire assignments; Table 6 describes port configuration.

TABLE 5

Low-Speed Port Pin Assignments

| Pin | Signal | Description |
|---|---|---|
| 1 | RX | Receive Data |
| 2 | CTS | Clear to Send |
| 3 | DCD | Data Carrier Detect |
| 4 | SG | Signal Ground |
| 5 | DSR | Data Set Ready |
| 6 | DTR | Data Terminal Ready |
| 7 | RTS | Request to Send |
| 8 | TX | Transmit Data |

TABLE 6

Low-Speed Port - Standard Configuration

| | |
|---|---|
| Port Type | DCE |
| RTS/CTS Strapping | Off |
| Baud Rate (bit/s) | 1200 |
| Stop Bits | 1 |
| Character Length | 8 bits |
| Parity | None |

Alternate port configurations are possible, and increase the variety of subscriber-premises equipment that can be connected. Options include configuration as DTE, flow control signaling, and character-format options (parity, number of stop bits, character length, baud rate).

The Loop Frame

Figure 3:
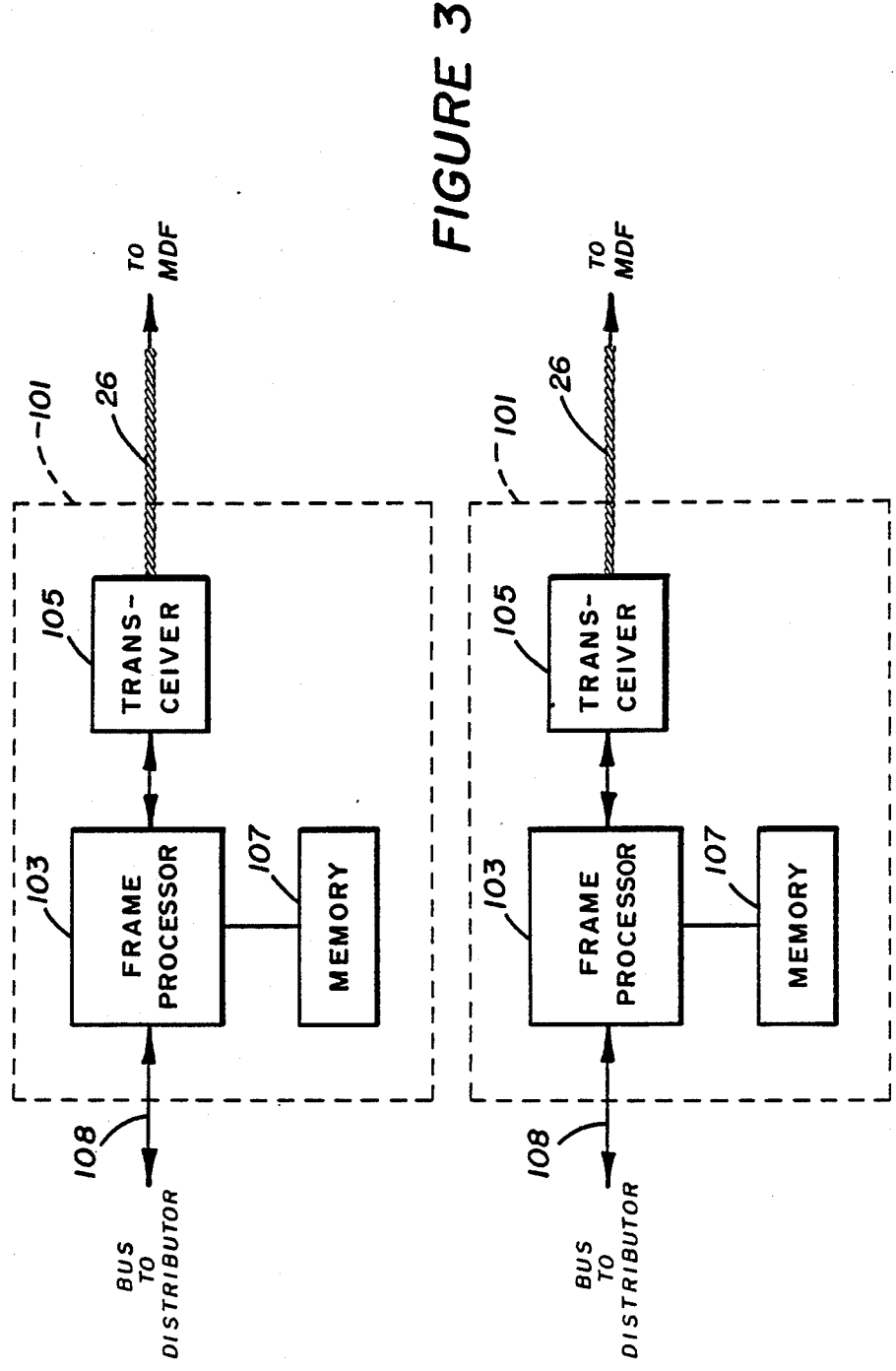
FIG. 3 is a schematic block diagram of a loop card used in the loop frame illustrated in FIG. 1 and which also illustrates the configuration of a gate card used in the gateways illustrated in FIG. 1.

FIG. 3 illustrates in greater detail the confirguration of the loop frame 24. The loop frame is comprised of a plurality of loop cards 101, two of which are shown in FIG. 3. Preferrably each loop frame comprises several sections or cages, each of which includes 12 loop cards and a supervisor card (FIG. 4).

As may be seen from FIG. 3, each loop card 101 includes a frame processor 103, a transceiver 105 and a memory 107. In each loop card, the frame processor 103 is coupled by the transceiver 105 to the twisted pair 26 associated with each subscriber loop 16 terminated at the main distribution frame 22. The frame processor 103 is also connected to the supervisor card for its loop cage via a suitable bus 108. The TDM bursts arriving at the transceiver 105 via the loop 26 are broken apart by the frame processor 103 into their respective types or channels of information, (in the preferred embodiment, two voice channels, a medium speed data channel, and four low speed data channels). This information is stored as needed in the memory 107 until it is assembled into the data word length used by the system, (in the preferred embodiment, nine bits). Added to each dataword is a bit which designates the word as an information or data word, as distinguished from a control word. The frame processor 103 then outputs the words as assembled to an internal bus 108 in a time frame which identifies that particular nyte as to both its source and its destination. The identification factor is controlled by the master supervisor 27 (FIG. 1) which passes its control words through the system as needed using the same buses and connections as are used for the communications information. This is supervised by the loop cage supervisor card illustrated in FIG. 4.

The loop cage supervisor card includes a distributor 109 which receives information from the internal bus 108. Connected to the distributor 109 is a configuration memory 111, and a supervisor 113. The supervisor 113 is provided with a RAM/ROM 115 which downloads code from the control and management system or CMS 29. The supervisor is also connected to a utility processor first-in first-out memory or FIFO 117. The supervisor 113 is also connected to a supervicor first-in first-out memory or FIFO 119.

The configuration memory 111 sequences the distributor 109 through a series of instructions on what to do with each nyte or data word in a particular time slot. A full sequence through the instructions is referred to as a superframe and, in the preferred embodiment, consists of 1,792 time slots.

The supervisor 113 changes the transceiver parameters and also handles the multiplex protocol between the frame processor (FIG. 3) and the remote multiplexer units (FIG. 2), via a control channel established through using extra time slots in the system for control signals.

The distributor reads or writes data from and to the configuration memory, preferrably converting 9 serial bits onto 9 wires for time compression. Since the supervisor performs only one task at a time, the supervisor FIFO and the utility processor FIFO are utilized to store the control information for the supervisor until the supervisor is ready to utilize it.

System Supervision

A feature of the present invention is that the loop frame supervisor (FIG. 4) is similar in function to all other supervisors described below. The supervision of the telephone system is distributed across each cage in the loop frame and the corresponding structure in the gateways. Thus, the following description refers generally to the master supervisor domain, with details of the function of the cage supervisor thereafter.

Returning to FIG. 1, the master supervisor 27 receives CMS 29 control and management messages for equipment in the master supervisor domain. When CMS control messages are received, the master supervisor transmits control information to the appropriate cage supervisors (FIG. 4). The master supervisor communicates with the cage supervisors over control channels carried on the TDM buses using time slots specifically set aside for the control signals. The master supervisor 27 sends service request to the cage supervisors. When a service operation is completed, the cage supervisor sends an appropriate status message to the master supervisor. The master supervisor then transmits all necessary control information received from the cage supervisors to the CMS 29. The master supervisor communicates with the loop cage supervisors to control and monitor the loop cards and the associated remote multiplexer units 18.

Figure 5:
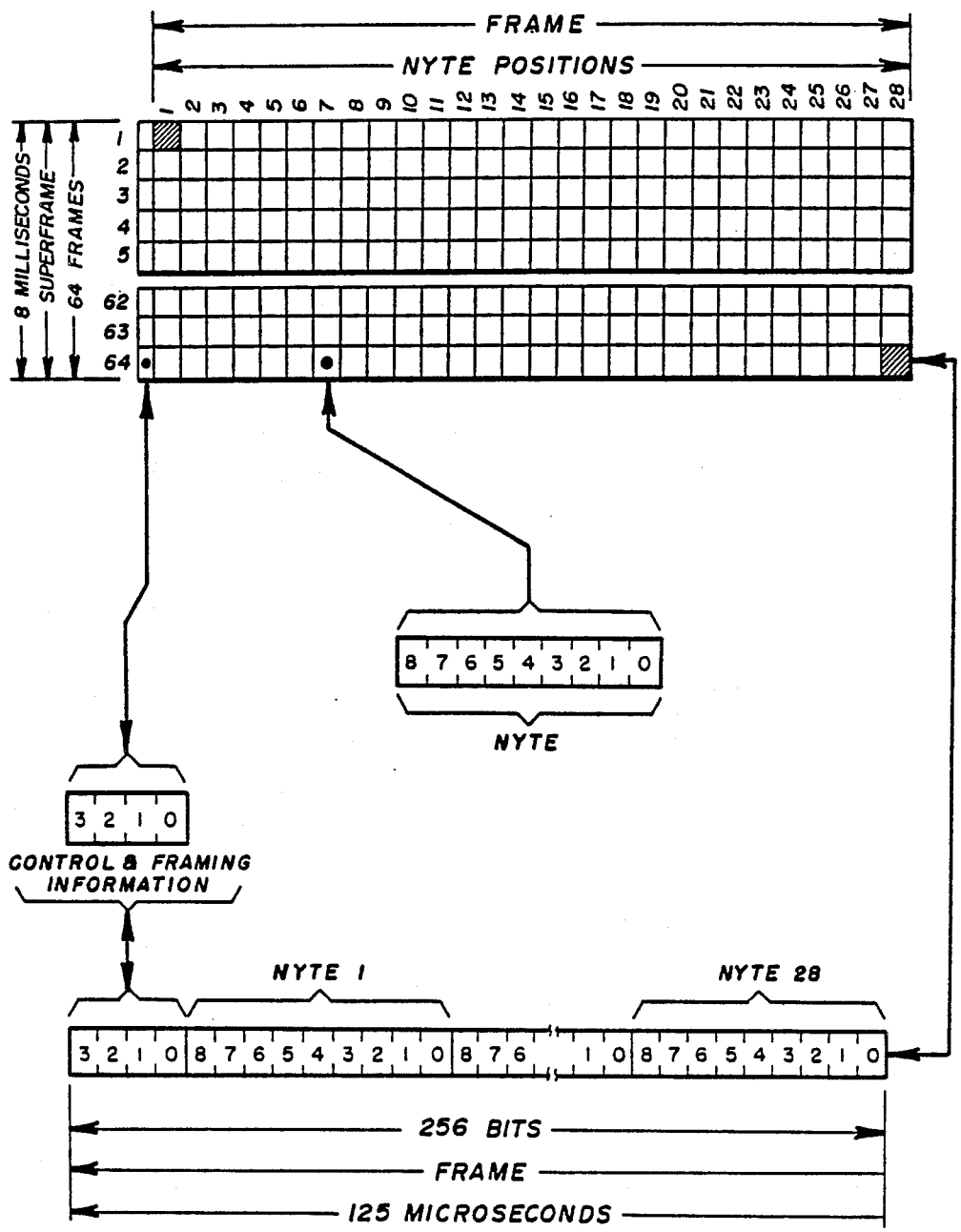
FIG. 5 is a data format diagram associated with the system switch illustrated in FIG. 1.

In the preferred embodiment, the entire system is run synchronously under control of a 16.384 MHz backplane clock signal provided by a suitable main timing control (not shown). Each TDM input is, preferably, a 2.048 megabit per second serial data stream organized as shown in FIG. 5. It consists of 64 frames of 256 bits per frame. The first four bits of each frame are used for framing signals and the remaining 252 bits represent 28 data words comprising, 9 bit bytes or nytes.

Each frame is 125 microseconds long with 64 frames constituting a superframe eight milliseconds in length. The nytes from up to 72 TDM channels are collected and subsequently output onto a central data switch backplane bus (described below), 9 bits parallel, at a 16.384 meganyte per second rate. The various system data buses, being identical in format, run synchronously within the central office at 2.048 megabits per second. Preferrably, each internal TDM channel carries data allotted to voice, low speed and medium speed digital data channels, as well as control information.

The System Switch

The design of the system switch 25 is preferrably divided into segments or switch cages, each of which supports up to 72 TDM channels. These TDM input channels may be from any number of sources as long as the data arrival times at the switch interface are maintained in synchronism with the basic system timing reference of the central office. Generally, each data switch cage includes 12 switch cards and an associated switch supervisor card. Each switch card is configured to accept six TDM channels. The TDM data is organized in eight millisecond superframes. As described in greater detail below, a data component switched through the data switch adds two superframe times or sixteen milliseconds to the data path.

Each switch cage (FIG. 6), in the preferred embodiment, includes a plurality of data switch cards 131 supported by a backplane bus 135. Twelve positions are for switch cards 131 and one is for the switch supervisor card 133. A second bus 137 is provided for redundancy. Each card 131, 133 communicates with the high speed bus 135, 137 on the backplane. The switch cards also connect with the TDM cable connector to provide access to the TDM busses 45. The TDM cables plugged in here go directly to the gateways and loopcages (FIG. 1). The switch supervisor card 133 has a TDM cable connector 139 for communication with the master supervisor 27 (FIG. 1) and the control and management system 29.

The TDM channels 45 interface with the switch cards 131, which communicate with each other over the high speed backplane bus 135. The switch supervisor card 133 provides all the timing and control pulses for the switch cards 131, backplane 135, 137 and TDM 45 channels.

The data from all the 72 TDM channels appears on the high speed backplane bus during the same interval as a single superframe, that is the eight millisecond superframe period. Each TDM bit time encompasses eight backplane nyte time positions and thus each nyte time is coincident with 72 backplane nyte times. To allow for a switch card to switch quadrants as described below, the first nyte position of frame 1 and the last nyte position of frame 64 are not used, as shown in the CDS-TDM data format of FIG. 5.

Figure 7:
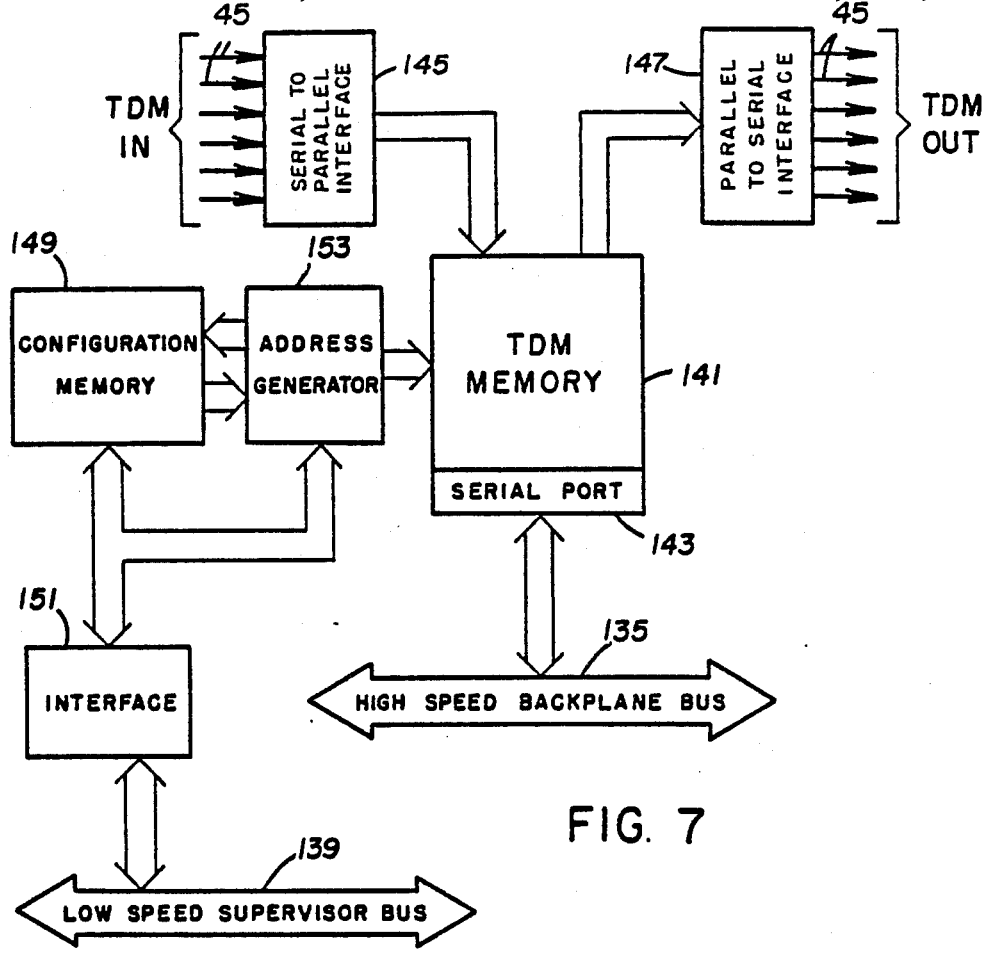
FIG. 7 is a schematic block diagram of a switch card used in the switch of FIG. 6.

A switch cage backplane (not shown), serves to interconnect the switch cards 131, and the supervisor card 133 as well as providing a path for the TDM signals to go from the switch cards to the TDM buses. As best seen in FIG. 7, a low speed supervisor bus 139 is provided to interconnect the supervisor card with the switch cards to supervise the memory mapped in the switch card memories for the low speed data.

As may also be seen in FIG. 7, each switch card 131 includes a TDM memory 141 connected to the high speed back plane bus 135 via a serial port 143. A serial to parallel interface 145 and a parallel to serial interface 147 couples the TDM memory to the TDM channels 45. A configuration memory 149 interacts with the low speed supervisor bus 139 through an appropriate interface 151 to operate an address generator 153. The address generator 153 is coupled to the TDM memory and provides control over the location in which the various data words are stored in and read out of the TDM memory 141. The TDM memory, in the preferred embodiment, is comprised of four quadrants. The total amount of information which may be stored in one quadrant is referred to hereinafter as a galactic frame.

In FIG. 8, a simplified block diagram of the central system switch card memory data flow section is shown. In a preferred embodiment, each card 131 is configured with a multiported 262,144 by 10 bit memory 141. This memory is capable of storing four full galactic frames. During each superframe, the following data transfers occur simultaneously:

1. Serial TDM data for six input TDM buses is converted to parallel and stored into a quarter of the switch card memory;

2. Parallel data from another quarter of the switch card memory is read and converted to serial and output as six output TDM buses;

3. A copy of an entire galactic frame from the backplane bus is stored into another quarter of the switch card memory; and 4. The fourth quarter of the switch card memory is used to drive the high speed backplane bus with selected nyte positions.

As best seen in FIG. 8, after the lapse of each galactic frame time, the assignment of the switch card memory quarters is altered. The TDM input area and the backplane output area swap places. Similarly, the TDM output area and the backplane input area swap places. This may be simply accomplished by changing the state of the most significant bit of the addresses for each of these quarters.

Addressing of the switch card memory 141 is accomplished by the address generator 53 (FIG. 7) providing sequential access, refresh, and TDM and channel mapped addresses. This address generator works in conjunction with the configuration memory 149 which maps the nyte position of the six TDM buses into the switch card memory 141 and thus into the galactic frame. The interface 151 from the configuration memory to the low speed backplane bus 139 provides communication with the switch cage supervisor card.

In the preferred embodiment, the configuration memory 149 consists of 24,576 words of 24 bits each. The layout of the configuration memory is shown in FIG. 9. Each of the six TDM buses consist of 1,792 nyte positions in each superframe. A memory location or address for each nyte position of each TDM bus is needed for each direction (TDM channels in and out) for full duplex switching. The resulting 21,504 locations are used to hold the addresses of nyte positions of the switch card memory 141. Thus each nyte position of a TDM channel corresponds to the nyte storage location in the switch card memory and hence, also corresponds to locations in the high speed backplane bus galactic frame. The configuration memory is loaded by the switch cage supervisor over the low speed backplane bus 139. The TDM input positions and the TDM output positions are offset by one nyte position.

Figure 10:
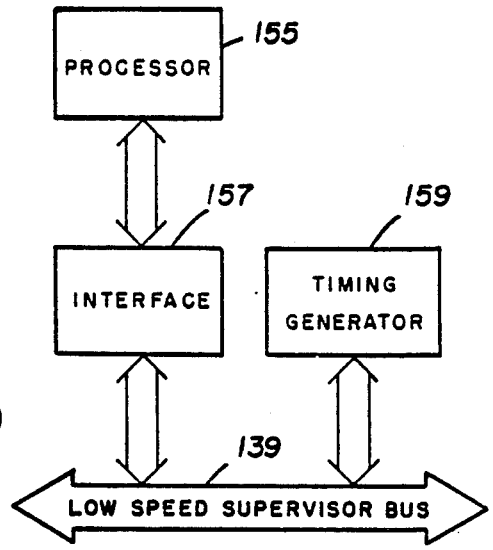
FIG. 10 is a schematic block diagram of a supervisor card used in the switch of FIG. 6.

The switch cage supervisor illustrated in FIG. 10, shows the supervisory processor section 155 with its interface 157 to the low speed switch cage supervisor bus 139 for communication with the switch card configuration memories. A timing generator 159 provides all timing signals on the supervisor bus 139 to operate the switch memories and TDM channel over the high speed backplane bus 135.

In operation, the system switch accepts time division multiplexed data channels from a plurality of input data buses and selectively multiplexes these inputs onto a common high speed internal bus from which the data may be demultiplexed for distribution back onto TDM channels leading to other locations. This is accomplished by organizing the incoming data into a series of galactic frames which are then dumped onto an internal or backplane bus serving the memory. The galactic frame on the backplane bus is then restored in the memory in a desired order for subsequent readout back to the TDM buses.

More particularly, a nyte arriving at one of the switch cards 131 is stored at a particular location in a quadrant of the memory of that switch card. The particular storage location is determined by the switch supervisor card 133 which, in turn, is instructed from the master supervisor 27 (FIG. 1). Once the memory quadrant in which the nyte is stored is full, the memory swaps the entire galactic frame in that quadrant to a read-out quadrant of the memory, from which it is read out, nyte by nyte in the order in which the nytes were stored and in parallel format, onto the nine-wire backplane bus 135.

Once on the backplane bus, each nyte is read out to a particular location in a quadrant of a memory in the same order in which it appears on the bus. Once that quadrant is filled with a galactic superframe of nytes from various other locations, it is swapped into a read-out quadrant of the same memory. From there, the nytes are read out serially onto a particular one of the TDM buses as selected by and in an order determined by the switch supervisor card, as instructed by the master supervisor.

Thus the sorting function of the switch takes place at two levels: the input to the switch cards from the TDM buses (according to location in the galactic frame assembled in memory), and the output to the TDM buses from the switch cards (according to the order in which the nytes are read out from memory and the particular TDM buses onto which each nyte is routed). This, coupled with the fact that a further sorting function can be performed between several switch cages through appropriate routing of TDM buses, provides a very rapid and reliable means for switching digital information.

The system switch thus provides time division multiplex data switching for full duplex data switching between TDM buses in accordance with the time slot or channel to which each data component is assigned.

The Gateways

The data on the buses 45 between the system switch 25 and the gateways 46–49 is organized as a time multiplexed serial data stream consisting of a plurality of digital data words (nytes) comprised of voice data, medium speed data and low speed data. The position of each digital data word in the serial data stream specifies the identity of the port in the remote multiplexer unit 18 at which the data originated. Each port has a unique identity in the telephone system; hence specifying a port also specifies the remote unit in which it is located. This input serial data stream is inputted to one of the gateways, which demultiplex the data and transmit the data to the proper destination. In the case of the low speed data, each digital data word in the serial data stream is sent to the vendor associated with the port on the remote unit through which that data word was inputted. Included with each data word sent to the vendor is the identity of the port in which it originated.

Each data destination, such as a service vendor, is connected to the gate circuit of a gateway by a telephone circuit over which it sends and receives digital data. For example, the low speed gateway 49 routes each data word intended for a specific vendor together with data specifying the identity of the subscriber to that vendor over the telephone circuit connecting that vendor to the gateway. Each data word is either a terminal data word specifying digital data inputted to a port or a signal data word specifying information used to determine if the device attached to the port is still connected and to control the flow of information between said device and the vendor with which it communicates. Each gateway includes means for detecting valid signal data words. In order to minimize the number of data words which must be sent to each destination, only valid signal words which differ from the previously received signal words are sent to each destination.

Data to be sent to equipment connected to a specific port of a remote multiplexer unit from a vendor is sent to the appropriate gateway on the telephone circuit connecting the vendor to the gateway. The gateway receives information from each vendor which specifies data words to be sent to specific ports. The gateway stores this information for transmission to the appropriate ports. At regular intervals the gateway generates a data word to be sent to each port to which it is connected. If data has been received from a vendor for a specific port, the oldest data word which has not been sent to that port is placed in an output serial data stream. If no data words have been received for transmission to a port, a default word associated with that port is sent.

Each data word destined for a particular port is incorporated into an output serial data stream which is transmitted to the system switch 25. This serial data stream is comprised of a plurality of digital data words, each said digital data word representing a data word which is to be sent to a specific port. The position of each digital data word in the serial data stream determines the port to which said digital data word is sent by the system switch 25 and the loop frame 24. The loop frame 24 demultiplexes the serial data stream and incorporates the data words contained therein into a digital burst sent to each remote multiplexer unit over the telephone circuit connecting said remote multiplexer unit to the central office.

The gateways 46-49 decode the input serial data stream into data words and provide each word with a tag specifying the remote multiplexer port in which said data word originated. This information is then transmitted to the appropriate location, such as a service vendor, over a telephone circuit which connects that location to the gateway. The identity of the location which is to receive each data word in the input serial data stream is stored in the gateway. For example, when a subscriber subscribes to a vendor's service, a low speed port on the subscriber's remote multiplexer unit is dedicated to that vendor. The identity of that port and of the vendor in question is stored in the low speed gateway at the time of subscription.

The gateways also receive data which is to be transmitted to specific ports or remote multiplexer units. This data is sent in a digital format over the telephone circuits used for connecting each location producing the data, such as a vendor, with the gateway. This data consists of one or more data words and the identity of the port to which the data words are to be sent. Each data word represents either terminal data to be transmitted to the device connected to the identified port or signal data to be used to update the state of the signal lines on the identified port. The gateway stores this data until the remote multiplexer requests a data word to be sent to an active port. When such a request is made, the gateway places an output serial data stream on the bus 45.

The output serial data stream consists of a plurality of digital data words in a time multiplexed serial format analogous to that used for the serial data stream directed from the switch 25 to the gateways. One such digital data word represents a data word to be sent to each active port or a remote multiplexer. The port to which each data word is to be sent is specified by the position of the corresponding digital data word in the output serial data stream. The loop frame 24 demultiplexes these data words and encodes the bit pattern of each data word into digital frames or bursts sent to each remote multiplexer unit on a subscriber loop.

The data word for a given port placed by a gateway in the output serial data stream is the oldest data word received by the gateway destined for that port which has not yet been sent to that port. If no such data word has been received, a default word consisting of signal data is generated by the gateway.

The generation of default words in the gateway relieves the outside equipment, such as vendor's premises equipment, of the need to produce default words when there is no new data to be sent to a specific port. In addition to reducing the complexity of the outside equipment, this reduces the amount of data which must be sent over each of the telephone circuits. This allows a given circuit to service more ports than would otherwise be possible.

Broadly, each of the gateways 46-49 is constructed similarly to the loop frame 24. Thus, each gateway includes a plurality of cages with each cage having 12 gateway cards plus a supervisor card. Each of the gate cards is appropriately configured to handle medium speed data, low speed data, or voice data, depending upon the particular gateway to which it is assigned. Each of the gateway cards, corresponding to the loop card shown in FIG. 3, is assigned to a particular destination. For example, the voice gateway 46 would have gateway cards of the configuration shown in FIG. 3 in which the transceiver outputs digital voice signals or analog voice signals to the interface 51 for formatting into signals processed by the central office voice switch. Each card in the voice gateway 46 would represent an individual telephone line. Similarly, each card in the medium speed gateways 47 and 48 would represent a medium speed port on a remote multiplexer unit. The low speed gateway 49 is, however, somewhat different, since each gate card in the low speed gateway represents a single service vendor as will be explained below.

In the gateway cards, the microprocessor corresponding to the frame processor 103 of FIG. 3 assembles the data words received by it into the appropriate transmission format depending upon the destination of the information. The microprocessor in the gate cards also functions to assemble information received by it in a particular format into a series of data words (in the preferred embodiment nytes) as described in connection with the loop card of FIG. 3.

Each group of gate cards in a gateway 46-49 is under the control of a supervisor card substantially identical with that shown in FIG. 4 in connection with the loop frame. Basically, the gate cage supervisor card functions to direct a series of TDM data words to the system switch 25 and to receive a stream of TDM data words from the system switch 25 for distribution to the various gate cards. The function of the gate cage supervisor is therefore essentially identical to that of the loop cage supervisor described in connection with FIG. 4.

The low speed gateway sends and receives data packets in a standard digital format to and from each of a plurality of vendors. Preferably, the data packets are sent in the X.25 digital format recommended by the International Telephone and Telegraph Consultative Committee. Other formats will be apparent to those skilled in the art. Each data packet sent to a vendor contains one or more data words from low speed data ports on the remote multiplexers, together with information specifying the identity of the port in which each data word originated. Each data packet received from a vendor contains one or more data words to be sent to specific ports together with information specifying the port which is to receive each data word. The low speed gateway 49 includes one vendor card (FIG. 3) for each vendor connected to the gateway. Each vendor card performs the above functions for data packets sent to or received from the vendor connected to it.

The input serial data stream to the gateways from the system switch 25 is demultiplexed by the frame processor 103 (FIG. 3). Each word in the input serial data stream is assigned an address which specifies the location to which it is to be sent and the port in which it originated. When a subscriber subscribes to a specific service, information is stored in a table which associates the services identity with a port 14 on the the subscriber's remote unit. Since the data word corresponding to this port is always located at the same position in the input serial data stream, this table consists of an address to be assigned to each digital word in the input serial data stream according to its position in the input serial data stream. The first word in the input serial data stream being assigned to the first address, the second word in the input serial data stream being assigned to the second address, and so on.

The output serial data stream sent to the system switch 25 by the gateways is generated in response to a signal from the remote multiplexer. Upon receipt of this signal, a data word is generated for each active port and is transmitted to the system switch 25. The identity of the port for which each data word is to be generated is determined from information contained in a table so that the position of the data word in the output serial data stream identifies the port to which that data word is to be sent. This table consists of one entry for each possible address, each entry giving the position in the output serial data stream to be used for the data word associated with that address when the address is received.

Conclusion

The digitizing system of the present invention may be readily incorporated into an existing analog-type telephone system for gradual and/or selective conversion of the subscriber services to the increased levels provided by digital communication. This conversion takes place without significant disruption of existing telephone service or equipment, inasmuch as the subscriber loops terminating at the main distribution frame may be selectively redirected to the digitizing system. The digitizing system processes voice data, and other data of differing speeds in a straightforward, simple, and reliable manner. Supervisory control over the system is readily accomplished on the same buses as communication information passes.

There has described a preferred embodiment of a novel digitizing system. It should now be apparent that those skilled in the art can make numerous uses of and modifications to the present invention without departing from the inventive concepts herein. Accordingly, the present invention is to be defined solely by the following claims.

What is claimed is:

1. An information transfer system for use in a telephone system wherein full duplex digital signal bursts each containing a plurality of different types of information are transmitted between a central office and each of a plurality of subscriber locations, and wherein signals respectively containing the different types of information in a predetermine format are transmitted between the central office and each of a plurality of selected locations outside said information transfer system which may or may not be subscriber locations, said information transfer system comprising:

signal processing means for receiving and disassembling the digital signal bursts into digital information words, each digital information word being comprised of only of the types of information in the digital signal bursts, said signal processing means also being for assembling digital information words of different types of information into digital signal bursts for transmission to respective subscriber locations, gateway means for each type of information for converting digital information words into a predetermined signal format, said gateway means including means for transmitting formatted signals for transmission to respective selected locations corresponding to respective time slots in which digital information words are received, said gateway means further including means and for receiving signals in a predetermined format from selected locations and converting same into digital information words in predetermined destination related time slots containing the respective type of information received, switch means coupling said signal processing means to said gateway means for routing the digital information words from said signal processing means to a respective one of said gateway menas corresponding to the type of information in the digital information word being routed and in a time slot corresponding to a predetermined destination for said respective digital information word, and for routing the digital information words from each of said gateway means to said signal processing means in a predetermined time slot corresponding to a respective one of said selected locations for assembly into digital signal bursts for a particular subscriber location, and control means coupled to said signal processing means, said gateway means, and said switch means for synchronously operating same and for placing each of said digital information words in a preallocated time slot corresponding to the source and destination of the information contained in the digital information word.

2. A system according to claim 1 wherein said signal processing means and said gateway means produce digital information words of equal bit length.

3. A system according to claim 1 wherein said switch means comprise first memory means for receiving and storing in a predetermined order digital information words received by said switch means from said signal processing means and said gateway means, a backplane bus and means for writing out each said stored digital information word to said backplane bus in the predetermined order, second memory means, means for reading each said digital information word on said backplane bus to said second memory means such that each digital information word is stored at a location corresponding to a time slot during which such digital information word is on said backplane bus, and means for reading each said digital information word stored in said second memory means and transmitting it in a predetermined order to said signal processing means and said gateway means, respectively.

4. A system according to claim 1 wherein said signal processing means includes a plurality of frame processor means and a distributor coupled thereto, each of said frame processor means being associated with a respective one of the subscriber locations, each of said frame processor means serving to form digital information words received from the associated subscriber location, said distributor means transmitting the digital information words formed by said frame processor means to said switch means in a predetermined order.

5. A system according to claim 1 wherein said gateway means comprise a plurality of gateway cards, each for receiving information from a respective selected location and forming digital information words therefrom, and a distributor connected to each of said gateway cards for receiving digital information words from said gateway cards and for transmitting said digital information words to said switch means in a predetermined order.

6. A system according to claim 1 including a plurality of remote multiplexer means, each located proximate a respective subscriber location, said remote multiplexer means including interfacing means for interfacing with subscriber owned communications equipment, burst processing means connected to said interfacing means for assembling digital signal bursts containing information corresponding to that received by said interfacing means, and transceiver means connected to said frame processing means for transmitting to and receiving from said signal processing means full duplex digital signal bursts containing such information.

7. A system according to claim 1 wherein the different types of information in the digital signal bursts include voice information and non-voice information.

8. A system according to claim 7 wherein said non-voice information includes medium speed data and low speed data.

9. A system according to claim 1 wherein said control means include means for transmitting control signals through said information transfer system as digital control words in predetermined time slots.

10. In a telephone system having a plurality of subscriber premises connected to a central office by a corresponding plurality of subscriber loops, an information transfer system for providing full duplex voice and data service between the subscriber premises and a plurality of preselected locations outside said information transfer system on an as-requested basis, comprising:

a remote multiplexer means located proximate each subscriber premise and electrically connected to the associated subscriber loop for transmitting on the subscriber loop bursts of digital information multiplexed from voice and data information originating at the subscriber premise, and for producing voice and data information at the subscriber premise derived from bursts of digital information received on the connected subscriber loop, a loop frame located at the central office and being electrically connected to those of the subscriber loops to which said remote multiplexer means are connected, said loop frame having means for separating digitals voice and digital data from bursts received on the connected subscriber loops and assembling said digital voice and digital data into digital words, respectively, and for combining digital voice and digital data words into bursts for transmission to said remote multiplexer means on the subscriber loops, gateway means at the central office responsive to receipt of digital voice and digital data words for directing and reformatting the information contained in said words to preselected locations corresponding to respective time slots in which digital information words are received, said gateway means further including means for assembling and transmitting in predetermined destination related time slots digital voice and data words containing information received in a predetermined format from the preselected locations in a predetermined format, and a system switch coupling said loop frame and said gateway means for routing said digital voice and digital data words in respective destination related time slots to said gateway means and for accepting digital voice and digital data words from said gateway means and directing them in respective destination related time slots via said loop frame to specific subscriber loop connected to said loop frame.

11. A system according to claim 10 including control means coupled to said loop frame, said system switch, and said gateway means for synchronously operating same and for placing each of said digital information words in a preallocated time slot corresponding to the source and destination of the information contained in the digital information word.

12. A system according to claim 10 wherein said loop frame and said gateway means produce digital information words of equal bit length.

13. A system according to claim 10 wherein said system switch comprises first memory means for receiving and storing in a predetermined order digital information words received by said system switch from said loop frame and said gateway means, a backplane bus and means for writing out each said stored digital information word to said backplane bus in the predetermined order, second memory means, means for reading each said digital information word on said backplane bus to said second memory means such that each digital information word is stored at a location corresponding to a time slot during which such digital information word is on said backplane bus, and means for reading each said digital information word stored in said second memory means and transmitting it in a predetermined order to said loop frame and said gateway means, respectively.

14. A system according to claim 10 wherein said loop frame includes a plurality of frame processor means and a distributor coupled thereto, each of said frame processor means being associated with a respective one of the subscriber loops, each of said frame processor means serving to form digital information words received from the associated subscriber loop, said distributor means transmitting the digital information words formed by said frame processor means to said system switch in a predetermined order.

15. A system according to claim 10 wherein said gateway means comprise a plurality of gateway cards, each for receiving information from a preselected location, and a distributor connected to each of said gateway cards for receiving digital information words from said gateway cards and for transmitting said digital information words to said system switch in a predetermined order.

16. A system according to claim 10 wherein said remote multiplexer means each includes interfacing means for interfacing with subscriber owned communications equipment, burst processing means connected to said interfacing means for assembling digital signal bursts containing information corresponding to that received by said interfacing means, and transceiver means connected to said frame processing means for transmitting to and receiving from said loop frame full duplex digital signal bursts containing such information.

17. A system according to claim 10 wherein said data information includes medium speed data and low speed data.

18. A system according to claim 11 wherein said control means include means for transmitting control signals through said information transfer system as digital control words in predetermined time slots.

19. In a telephone system having a central office with a central office voice switch and a plurality of subscriber loops, each connecting a subscriber location to said central office, an information transfer system comprising:

a plurality of remote multiplexer units, each of said units being electrically coupled to an associated one of the subscriber loops at the subscriber location, each of said remote multiplexer units including encoding means responsive to a plurality of sources at the subscriber premises providing first voice signals, second voice signals, low speed data signals and medium speed data signals, for encoding all of said voice signals and said data signals into a plurality of successive frames, each of said remote multiplexer units having transmitting means for transmitting said successive frames from each of said units on the associated subscriber loop, each of said frames having first voice bits encoding said first voice signals, second voice bits encoding said second voice signals, first data bits encoding said low speed data signals, and second data bits encoding said medium speed data signals;

a loop frame electrically coupled to the subscriber loops at the central office end thereof opposite an associated remote multiplexer unit and including decoding means for decoding each of said successive frames into a first voice information signal from said first voice bits, a second voice information signal from said second voice bits, a low speed data information signal from said low speed data bits and a medium speed data information signal from said medium speed data bits, said low speed and medium speed data information signals comprising digital information words of equal length, a plurality of gate means at said central office for reformatting said medium speed data digital information words into a plurality of medium speed data bit streams each corresponding to a respective data services vendor and for routing said medium speed data bit streams to the respective data services vendors, and for reformatting said low speed data digital information words into a plurality of low speed data bit streams each corresponding to a respective data services vendor and for routing each of said low speed data bit streams to the respective data services vendors;

and digital word switch means at said central office for routing said digital information words to corresponding ones of said gate means in a predetermined time slot corresponding to a respective service vendor destination.

20. A system according to claim 19 including means for directing said first and second voice information signals from said loop frame to the central office voice switch.

21. A system according to claim 19 wherein said first and second voice information signals comprise first and second voice digital information words of equal length, wherein said system includes gate means for routing said first and second voice digital information words to the central office voice switch, and wherein said digital word switch means routes said first and second voice digital information words to said last recited gate means.

* * * * *

UNITED STATES PATENT AND TRADEMARK OFFICE
CERTIFICATE OF CORRECTION

PATENT NO. : 4,716,562

DATED : December 29, 1987

INVENTOR(S) : Gregg D. Carse, Bernard N. Daines

It is certified that error appears in the above-identified patent and that said Letters Patent is hereby corrected as shown below:

Column 1, line 5, after "1985" delete ", now abandoned".

Column 3, line 44, delete "in" and insert therefor --is--.

Column 7, line 11, delete "centrol" and insert therefor --central--.

Column 9, line 20, after "from" insert --the--.

Column 9, line 21, delete "the" before "office".

Column 14, line 33, delete "supervicor" and insert therefor --supervisor--.

Column 15, line 57, delete "busses" and insert therefor --buses--.

Column 21, line 33, after "has" insert --been--.

Column 21, line 55, after "only" insert --one--.

Column 22, line 19, delete "subscriber" and insert therefor --selected--.

UNITED STATES PATENT AND TRADEMARK OFFICE
CERTIFICATE OF CORRECTION

PATENT NO. : 4,716,562

DATED : December 29, 1987

INVENTOR(S) : Gregg D. Carse, Bernard N. Daines

It is certified that error appears in the above-identified patent and that said Letters Patent is hereby corrected as shown below:

Column 23, line 41, delete "digitals" and insert therefor --digital--.

Signed and Sealed this

Eighteenth Day of October, 1988

Attest:

DONALD J. QUIGG

*Attesting Officer*        *Commissioner of Patents and Trademarks*